(12) United States Patent
Luo et al.

(10) Patent No.: US 12,504,631 B2
(45) Date of Patent: Dec. 23, 2025

(54) METHOD OF DISPLAY DEVICE, DISPLAY DEVICE AND NEAR-EYE DISPLAY APPARATUS

(71) Applicant: SEEYA OPTRONICS CO., LTD., Shanghai (CN)

(72) Inventors: Liyuan Luo, Shanghai (CN); Run Yang, Shanghai (CN); Zhanghe Zeng, Shanghai (CN); Meng Cui, Shanghai (CN); Zhongshou Huang, Shanghai (CN); Wanwan Xia, Shanghai (CN); Peng Yan, Shanghai (CN)

(73) Assignee: SEEYA OPTRONICS CO., LTD., Shanghai (CN)

( * ) Notice: Subject to any disclaimer, the term of this patent is extended or adjusted under 35 U.S.C. 154(b) by 315 days.

(21) Appl. No.: 18/490,048

(22) Filed: Oct. 19, 2023

(65) Prior Publication Data
US 2024/0210698 A1    Jun. 27, 2024

(30) Foreign Application Priority Data
Dec. 26, 2022 (CN) .......................... 202211673055.X

(51) Int. Cl.
G02B 27/01 (2006.01)
G02B 7/02 (2021.01)

(52) U.S. Cl.
CPC ......... *G02B 27/0172* (2013.01); *G02B 7/021* (2013.01); *G02B 27/0179* (2013.01); *G02B 2027/0154* (2013.01); *G02B 2027/0192* (2013.01); *G02B 2207/101* (2013.01)

(58) Field of Classification Search
CPC ............ G02B 27/0172; G02B 27/0179; G02B 7/021; G02B 2027/0154; G02B 2027/0192; G02B 2207/101
USPC .......................................................... 359/630
See application file for complete search history.

(56) References Cited

U.S. PATENT DOCUMENTS

| | | | |
|---|---|---|---|
| 10,606,092 B1* | 3/2020 | Lauer | G02B 30/27 |
| 10,935,775 B2* | 3/2021 | Tsur | G02B 21/025 |
| 11,372,139 B2* | 6/2022 | Tsur | G02B 3/0056 |
| 2018/0335615 A1* | 11/2018 | Tsur | G02F 1/133524 |
| 2018/0356567 A1* | 12/2018 | Wang | G02B 27/0172 |
| 2020/0363564 A1* | 11/2020 | Tsur | G02B 3/0062 |
| 2021/0072429 A1* | 3/2021 | Meng | G02B 27/0172 |
| 2021/0096378 A1* | 4/2021 | Aschwanden | G02B 3/0056 |

\* cited by examiner

*Primary Examiner* — William R Alexander
(74) *Attorney, Agent, or Firm* — DUANE MORRIS LLP

(57) ABSTRACT

Provided are a design method of a display device, a display device and a near-eye display apparatus. The display device includes a substrate, light-emitting elements and a light adjustment layer. The light-emitting elements are located on one side of the substrate and facing a light-emitting surface of the display device, and a pixel opening is configured in each light-emitting element. The light adjustment layer is located on one side of the light-emitting elements away from the substrate. The light adjustment layer includes at least one microlens array and a light-transmitting layer located on one side of the microlens array away from the substrate and covering the microlens array, the microlens array includes at least one microlens unit, and a refractive index of the at least one microlens unit is greater than a refractive index of the light-transmitting layer.

10 Claims, 12 Drawing Sheets

First spacing

Second spacing

METHOD OF DISPLAY DEVICE, DISPLAY DEVICE AND NEAR-EYE DISPLAY APPARATUS

CROSS-REFERENCE TO RELATED APPLICATION(S)

This application claims priority to Chinese Patent Application No. 202211673055.X filed Dec. 26, 2022, the disclosure of which is incorporated herein by reference in its entirety.

TECHNICAL FIELD

The present disclosure relates to the field of display technologies and, in particular, to a design method of a display device, a display device and a near-eye display apparatus.

BACKGROUND

To improve the display luminance of the related display device, a microlens array is generally configured on a light-emitting side of the display device in the related art, and the microlens array can adjust the direction of the light emitted by a light-emitting element. However, since the size of the opening of the light-emitting element is not the optimal, the light-emitting area and the drive current in the display device are relatively large, leading to waste. Therefore, it is necessary to optimize the size of the opening and numerical values of other components in the display device to ensure the display luminance of the display device while the total power consumption of the display device is reduced.

SUMMARY

The present disclosure provides a design method of a display device, a display device and a near-eye display apparatus so that the power consumption is reduced and the energy is saved while the display luminance is ensured.

In a first aspect, an embodiment of the present disclosure provides a display device. The display device includes a substrate, light-emitting elements and a light adjustment layer.

The light-emitting elements are located on one side of the substrate and facing a light-emitting surface of the display device, and a pixel opening is configured in each light-emitting element of the light-emitting elements.

The light adjustment layer is located on one side of the light-emitting elements away from the substrate.

The light adjustment layer includes at least one microlens array and a light-transmitting layer located on one side of the microlens array away from the substrate and covering the microlens array, the microlens array includes at least one microlens unit, and a refractive index of the at least one microlens unit is greater than a refractive index of the light-transmitting layer.

Along a thickness direction of the display device, the pixel opening at least partially overlaps the at least one microlens unit; and R denotes a size of the pixel opening and satisfies 0.8 µm≤R≤1.35 µm.

Optionally, n denotes a difference between the refractive index of the at least one microlens unit and the refractive index of the light-transmitting layer and n satisfies 0.2≤n≤0.35.

Optionally, a relationship between the size of the pixel opening and a difference between the refractive index of the at least one microlens unit and the refractive index of the light-transmitting layer satisfies:

$$R = 126.38n^3 - 78.819n^2 + 9.1209n + 1.8654.$$

R denotes the size of the pixel opening, and n denotes the difference between the refractive index of the at least one microlens unit and the refractive index of the light-transmitting layer.

Optionally, a relationship between central photon energy in the pixel opening, the refractive index of the at least one microlens unit and the refractive index of the light-transmitting layer satisfies:

$$y = 261057*(n_1 + (1.37 - n_2))^2 + 885676*(n_1 + (1.37 - n_2)) - 742972.$$

y denotes the central photon energy in the pixel opening, $n_1$ denotes the refractive index of the at least one microlens unit, and $n_2$ denotes the refractive index of the light-transmitting layer.

In a second aspect, an embodiment of the present disclosure provides a method for determining a pixel opening of a display device which is applied to the display device according to any of the first aspect.

The method for determining a pixel opening includes steps described below.

A first variation curve corresponding to different sizes of pixel openings, different refractive indices of microlens units and different refractive indices of light-transmitting layers is acquired.

A second variation curve corresponding to the different refractive indices of the microlens units, the different refractive indices of the light-transmitting layers and gain factors of the display device is acquired A parallel region range between the first variation curve and the second variation curve is selected according to the first variation curve and the second variation curve.

A size range of the pixel opening is acquired according to the parallel region range.

Optionally, after the size range of the pixel opening is acquired according to the parallel region range, steps described below are further included.

A refractive index of the microlens unit or a refractive index of the light-transmitting layer is acquired.

Photons are arranged in a region corresponding to a light-emitting element, and a maximum photon energy distribution profile is acquired according to the refractive index of the microlens unit or the refractive index of the light-transmitting layer.

Pole coordinates corresponding to the maximum photon energy distribution profile are obtained according to the maximum photon energy distribution profile.

A size of the pixel opening is determined according to the pole coordinates.

Optionally, the step of obtaining the pole coordinates corresponding to the maximum photon energy distribution profile according to the maximum photon energy distribution profile includes the following operations described below.

The maximum photon energy distribution profile is derived.

A corresponding minimum value is selected when a derivative is zero and a first pole abscissa and a second pole abscissa corresponding to the minimum value are determined. The determination of the size of the pixel opening according to the pole coordinates includes steps described below.

A difference operation is performed on the first pole abscissa and the second pole abscissa, and an absolute value operation is performed on a numerical value obtained by the difference operation so that the size of the pixel opening is determined.

Optionally, before the maximum photon energy distribution profile is acquired according to the refractive index of the microlens unit or the refractive index of the light-transmitting layer, steps described below are further included.

A maximum value of central photon energy in the region corresponding to the light-emitting element is acquired according to the refractive index of the microlens unit or the refractive index of the light-transmitting layer.

A refractive index of the microlens unit corresponding to the maximum value of the central photon energy and a refractive index of the light-transmitting layer corresponding to the maximum value of the central photon energy are determined according to the maximum value of the central photon energy.

Optionally, after the size of the pixel opening is acquired according to the pole coordinates, steps described below are further included.

Diameter-to-height ratio data of multiple microlens units is acquired.

Multiple first relative luminance distribution profiles corresponding to the display device are acquired according to the diameter-to-height ratio data.

A first relative luminance distribution profile corresponding to maximum relative luminance is determined according to the multiple first relative luminance distribution profiles.

A diameter-to-height ratio numerical value is determined according to the first relative luminance distribution profile of the maximum relative luminance.

First spacing data of multiple adjacent microlens units are acquired.

Multiple second relative luminance distribution profiles corresponding to the display device are acquired according to the first spacing data.

A second relative luminance distribution profile corresponding to maximum relative luminance is determined according to the multiple second relative luminance distribution profiles.

A first spacing numerical value is determined according to the second relative luminance distribution profile of the maximum relative luminance.

Second spacing data between surfaces of the microlens units facing to a substrate and the light-emitting element is acquired along a first direction.

Multiple third relative luminance distribution profiles corresponding to the display device are acquired according to the multiple pieces of second spacing data.

A third relative luminance distribution profile of maximum relative luminance is determined according to the multiple third relative luminance distribution profiles.

A second spacing numerical value is determined according to the third relative luminance distribution profile of the maximum relative luminance.

The first direction is a thickness direction of the display device.

In a third aspect, a near-eye display apparatus is provided, and the near-eye display apparatus includes the display device according to any one of the first aspect.

Technical solutions of embodiments of the present disclosure provide a design method of a display device, a display device and a near-eye display apparatus. The display device includes a substrate, light-emitting elements and a light adjustment layer. The light-emitting elements are located on one side of the substrate and facing a light-emitting surface of the display device, and a pixel opening is configured in each light-emitting element. The light adjustment layer is located on one side of the light-emitting elements away from the substrate. The light adjustment layer includes at least one microlens array and a light-transmitting layer located on one side of the microlens array away from the substrate and covering the microlens array, the microlens array includes at least one microlens unit, and a refractive index of the at least one microlens unit is greater than a refractive index of the light-transmitting layer. Along a thickness direction of the display device, the pixel opening at least partially overlaps the at least one microlens unit; and R denotes the size of the pixel opening and satisfies 0.8 µm≤R≤1.35 µm. The size of the pixel opening in the display device is rationally set, so that the power consumption is reduced and the energy loss is reduced while the luminance is ensured.

It is to be understood that the content described in this part is not intended to identify key or important features of the embodiments of the present disclosure and is not intended to limit the scope of the present disclosure. Other features of the present disclosure will become readily understood through the description hereinafter.

BRIEF DESCRIPTION OF DRAWINGS

To illustrate technical solutions in embodiments of the present disclosure more clearly, drawings used in description of the embodiments will be briefly described below. Apparently, the drawings described below illustrate part of the embodiments of the present disclosure, and those of ordinary skill in the art may obtain other drawings based on the drawings described below on the premise that no creative work is done.

DETAILED DESCRIPTION

The technical solutions in embodiments of the present disclosure will be described clearly and completely in conjunction with the drawings in the embodiments of the present disclosure from which the solutions of the present disclosure will be better understood by those skilled in the art. Apparently, the embodiments described below are part, not all, of the embodiments of the present disclosure. Based on the embodiments described in the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used for distinguishing between similar objects and are not necessarily used for describing a particular order or sequence. It should be understood that the data used in this manner is interchangeable in appropriate cases so that the embodiments of the present disclosure described here can be implemented in an order not illustrated or described here. In addition, terms "comprising", "including" and any other variation thereof are intended to encompass a non-exclusive inclusion. For example, a process, method, system, product or device that includes a series of steps or units not only includes the expressly listed steps or units, but may also include other steps or units that are not expressly listed or are inherent to such a process, method, product or device.

Figure 1:
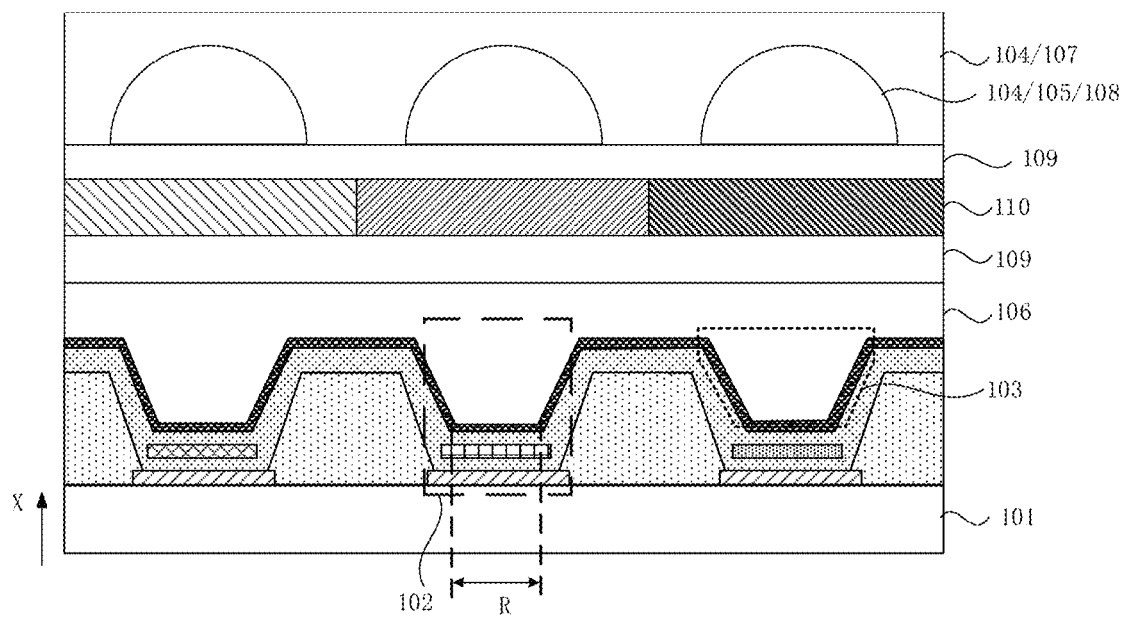
FIG. 1 is a structural diagram of a display device according to an embodiment of the present disclosure.
Figure 2:
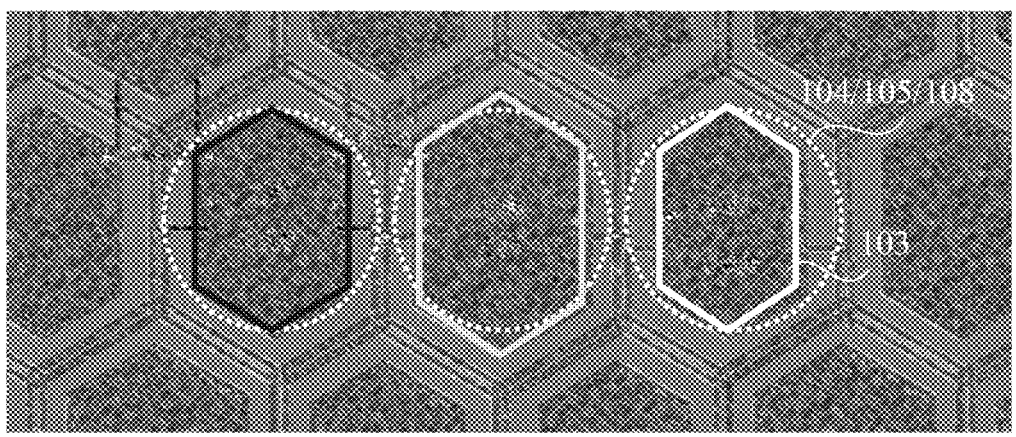
FIG. 2 is a top view of a display device according to an embodiment of the present disclosure.

FIG. 1 is a structural diagram of a display device according to an embodiment of the present disclosure, and FIG. 2 is a top view of a display device according to an embodiment of the present disclosure. As shown in FIG. 1 and FIG. 2, the display device 100 includes a substrate 101, light-emitting elements 102 and a light adjustment layer 104. The light-emitting elements 104 are located on one side of the substrate 101 and facing a light-emitting surface of the display device 100, and a pixel opening 103 is configured in each light-emitting element 102. The light adjustment layer 104 is located on one side of the light-emitting elements 102 away from the substrate 101. The light adjustment layer 104 includes at least one microlens array 105 and a light-transmitting layer 107 located on one side of the microlens array 105 away from the substrate 101 and covering the microlens array 105, the microlens array 105 includes at least one microlens unit 108, and a refractive index of the at least one microlens unit 108 is greater than a refractive index of the light-transmitting layer 107. Along a thickness direction X of the display device 100, the pixel opening 103 at least partially overlaps one microlens unit 108; R denotes the size of the pixel opening 103 and satisfies 0.8 µm≤R≤1.35 µm.

The substrate 101 may be a silicon-based substrate or a substrate made of other materials. The material of the substrate 101 may be selected according to actual design requirements, which is not limited in the embodiment of the present disclosure. Multiple light-emitting elements 102 located on one side of the substrate 101 may include light-emitting elements 102 of different colors, such as red light-emitting elements, green light-emitting elements and blue light-emitting elements, or include white light-emitting elements 102 of the same color. The light-emitting elements of different colors may be disposed in different organic light-emitting film layers or may share the same organic light-emitting film layer. The light-emitting elements 102 may be specifically selected according to actual design requirements, which is not limited in the embodiment of the present disclosure. The red light-emitting elements, green light-emitting elements and blue light-emitting elements disposed in the display device 100 can achieve color display. The pixel opening 103 is configured in each light-emitting element 102, and the size of the pixel opening 103 affects the light-emitting area and the light emission luminance of the light-emitting element 102. Therefore, the display effect of the display device 100 can be ensured by rationally setting the size and shape of the pixel opening 103. The light adjustment layer 104 is disposed on the side of the light-emitting elements 102 away from the substrate 101. The light adjustment layer 104 is configured to adjust the direction of the light emitted from the light-emitting elements 102 so that the light is emitted to a front view angle direction as much as possible. The light adjustment layer 104 includes the microlens array 105, the microlens array 105 include multiple microlens units 108, and the light adjustment layer 104 further includes the light-transmitting layer 107 located on the side of the microlens array 105 away from the substrate 101 and covering the microlens array 105. Since the refractive index of the microlens unit 108 is greater than the refractive index of the light-transmitting layer 107, the light adjusted by the microlens array 105 incident on the light-transmitting layer 107 through an interface between the microlens unit 108 and the light-transmitting layer 107 can be deflected again, so that the light is ensured to be deflected to a direction parallel to the optical axis of the microlens unit 108. Moreover, along the thickness direction X of the display device 100, the pixel opening 103 at least partially overlaps one microlens unit 108, so that a microlens unit 108 is disposed corresponding to each light-emitting element 102. Therefore, the light emitted by each light-emitting element 102 can be adjusted, and the light emission effect from the front view angle and the display effect of the display device 100 are ensured. An encapsulation layer 106 is further disposed on the side of the light-emitting elements 102 away from the substrate 101. The encapsulation layer 106 includes a three-layer structure, that is, the structure of an inorganic layer, an organic layer and an inorganic layer, so that the light-emitting elements 102 are protected by encapsulation from being eroded by external water and oxygen. An isolation layer 109 is further disposed on a side of the encapsulation layer 106 away from the substrate 101. The isolation layer 109 is generally made of an inorganic insulating material and for the use of planarization and insulation to a certain extent. For a display device 100 in which a color resistance layer 110 is disposed between the microlens units 108 and the light-emitting elements 102, isolation layers 109 are generally disposed on both one side of the color resistance layer 110 facing to the substrate 101 and one side of the color resistance layer 110 away from the substrate 101.

Figure 3:
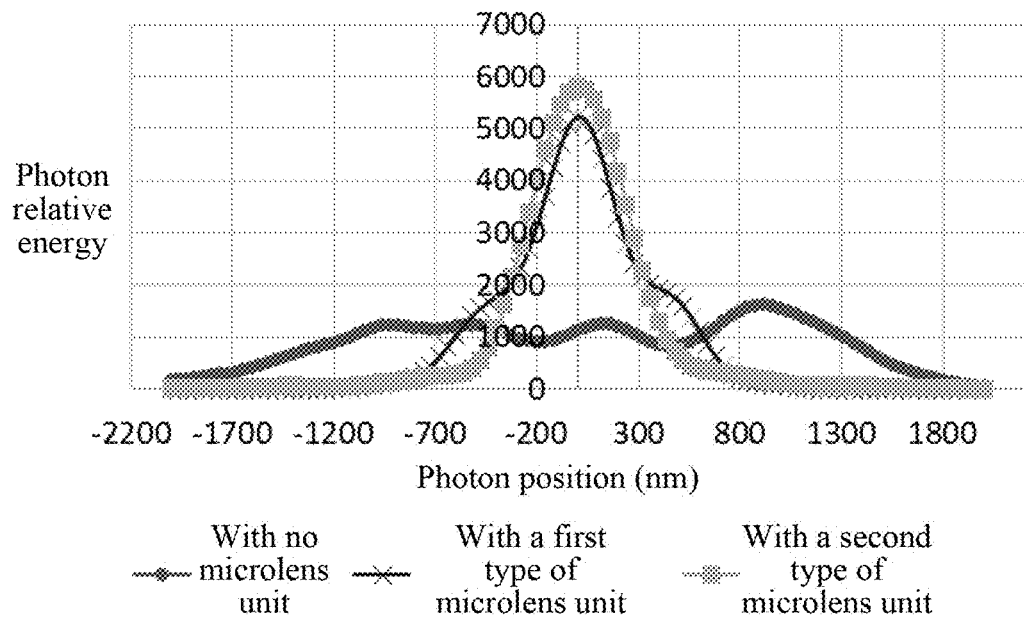
FIG. 3 is a graph showing distribution profiles of photon energy in pixel openings of different microlens units according to an embodiment of the present disclosure.
Figure 4:
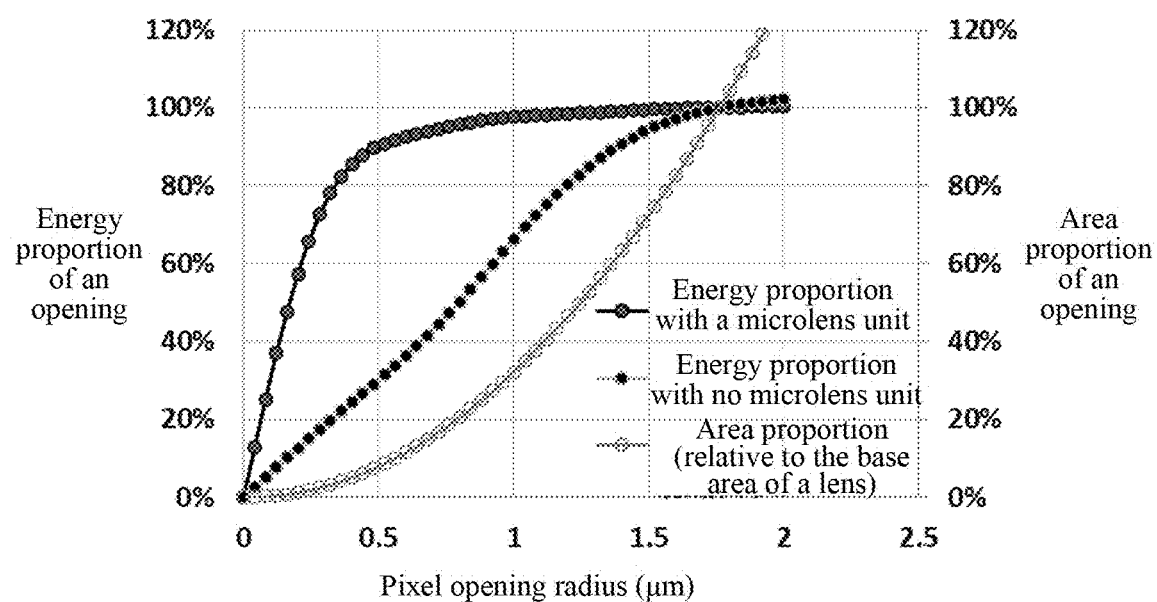
FIG. 4 is a graph showing variation curves of pixel opening sizes and photon energy of different microlens units according to an embodiment of the present disclosure.

Further, FIG. 3 is a graph showing distribution profiles of photon energy in pixel openings of different microlens units according to an embodiment of the present disclosure, and FIG. 4 is a graph showing variation curves of pixel opening sizes and photon energy of different microlens units according to an embodiment of the present disclosure. As shown in FIG. 3 and FIG. 4, only the light emitted from the central region of the pixel opening 103 in the light-emitting element 102 can contribute to light emission at the front view angle, and other regions of the pixel opening 103 except the central region do not contribute much to the light emission at the front view angle. That is, when the size of the pixel opening 103 reaches a certain width, the total photon energy hardly increases as the opening size increases, and thus the increased size of the pixel opening 103 contributes slightly to the energy. Conversely, energy is lost, and power consumption is increased. Therefore, it is necessary to rationally adjust the size R of the pixel opening 103, where 0.8 μm≤R≤1.35 μm. In this manner, the size of the pixel opening 103 is optimized so that power consumption is reduced on the premise that the display effect is ensured.

In the embodiment of the present disclosure, the size of the pixel opening of the light-emitting element in the display device is rationally set, so that the effective light-emitting region of the pixel opening is remained on the premise that the display effect of the display device is ensured, and thus the energy is saved as much as possible and the power consumption is reduced.

Optionally, with continued reference to FIG. 1, n denotes the difference between the refractive index of the microlens unit 108 and the refractive index of the light-transmitting layer 107, and n satisfies 0.2≤n≤0.35.

A certain corresponding relationship exists between the refractive index of the light adjustment layer 104 and the size of the pixel opening 103, which affects the display effect of the display device 100. The difference n between the refractive index of the microlens unit 108 and the refractive index of the light-transmitting layer 107 ranges from 0.2 to 0.35; therefore, if the refractive index of the microlens unit 108 is determined, the refractive index of the light-transmitting layer 107 can be determined. Similarly, if the refractive index of the light-transmitting layer 107 is determined, the refractive index of the microlens unit 108 can be determined. Generally, the refractive index of the microlens unit 108 ranges from 1.5 to 1.85, and the refractive index of the light-transmitting layer 107 ranges from 1 to 1.6. The numerical value of the refractive index of the microlens unit 108 and the numerical value of the refractive index of the light-transmitting layer 107 may be selected according to actual design requirements, which is not limited in the embodiment of the present disclosure.

Optionally, referring to FIG. 1, a relationship between the size of the pixel opening 103 and a difference between the refractive index of the microlens unit 108 and the refractive index of the light-transmitting layer 107 satisfies:

$$R = 126.38n^3 - 78.819n^2 + 9.1209n + 1.8654.$$

R denotes the size of the pixel opening 103, and n denotes the difference between the refractive index of the microlens unit 108 and the refractive index of the light-transmitting layer 107.

The size of the pixel opening 103 and the difference between the refractive index of the microlens unit 108 and the refractive index of the light-transmitting layer 107 satisfy the preceding formula. In the case where the refractive index of the microlens unit 108 and the refractive index of the light-transmitting layer 107 are determined, an effective size of the pixel opening 103 can be correspondingly obtained; therefore the power consumption of the display device 100 can be effectively saved.

Optionally, with continued reference to FIG. 1, a relationship between central photon energy in the pixel opening 103, the refractive index of the microlens unit 108 and the refractive index of the light-transmitting layer 107 satisfies:

$$y = 261057 * (n_1 + (1.37 - n_2))^2 + 885676 * (n_1 + (1.37 - n_2)) - 742972.$$

y denotes the central photon energy in the pixel opening 103, $n_1$ denotes the refractive index of the microlens unit 108, and $n_2$ denotes the refractive index of the light-transmitting layer 107.

As the refractive index of the microlens unit 108 and the refractive index of the light-transmitting layer 107 change, corresponding variation curves of the central photon energy in the pixel opening 103 can be obtained; that is, according to different refractive indices of the microlens units 108 and different refractive indices of the light-transmitting layer 107, the central photon energy in the pixel opening 103 can be correspondingly obtained. In this manner, the numerical value of the refractive index of the microlens unit 108 and the numerical value of the refractive index of the light-transmitting layer 107 corresponding to the maximum central photon energy can be determined, the minimum effective area of the pixel opening 103 can be obtained, and thus the power consumption of the display device 100 can be reduced while the display effect can be ensured.

Figure 5:
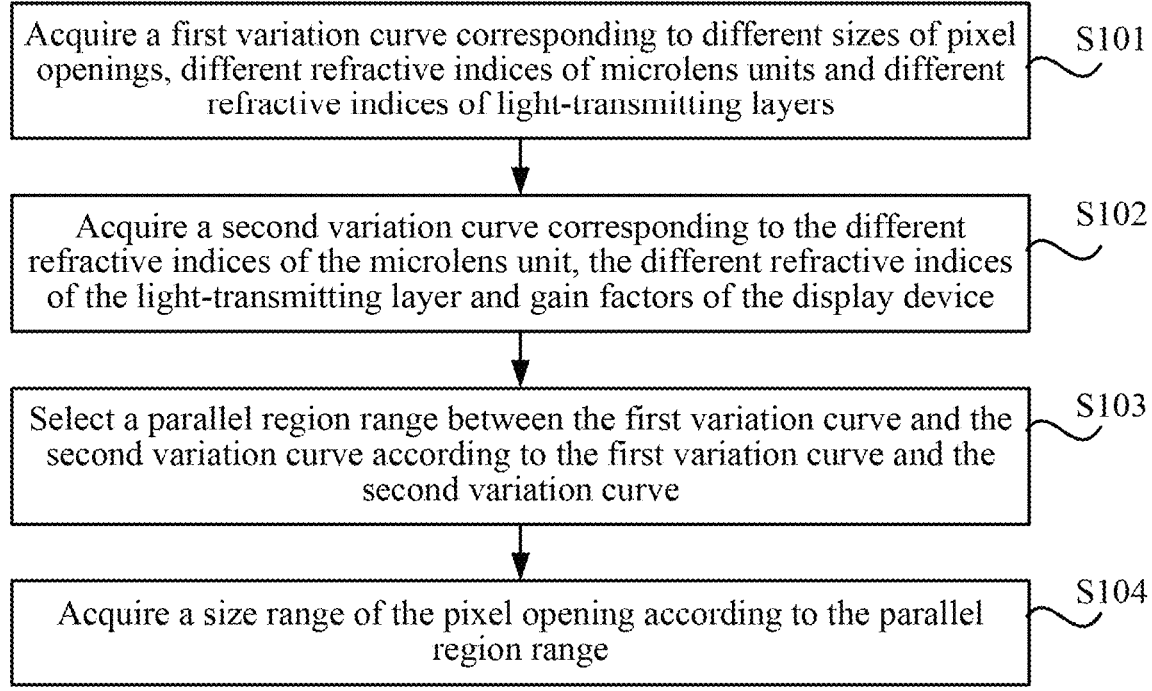
FIG. 5 is a flowchart of a method for determining a pixel opening of a display device according to an embodiment of the present disclosure.
Figure 6:
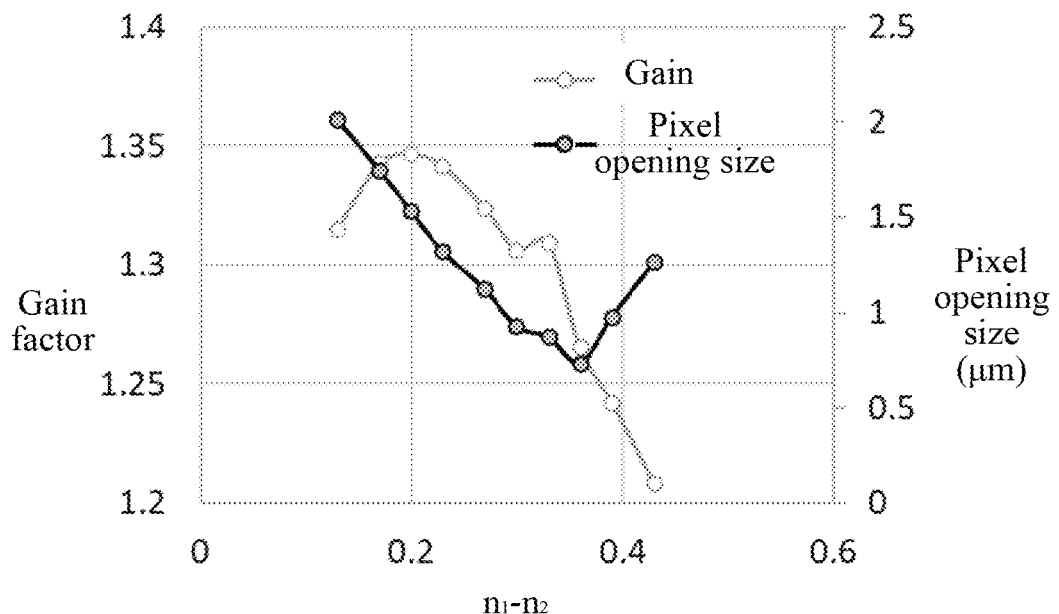
FIG. 6 is a graph showing a corresponding relationship between pixel openings of a display device and differences between refractive indices of a microlens unit and refractive indices of a light-transmitting layer and a corresponding relationship between gain factors and the differences between the refractive indices of the microlens unit and the refractive indices of the light-transmitting layer according to an embodiment of the present disclosure.

FIG. 5 is a flowchart of a method for determining a pixel opening of a display device according to an embodiment of the present disclosure, and FIG. 6 is a graph showing a corresponding relationship between sizes of pixel openings of a display device and differences between refractive indices of microlens units and refractive indices of a light-transmitting layer and a corresponding relationship between gain factors and the differences between the refractive indices of the microlens unit and the refractive indices of the light-transmitting layer according to an embodiment of the present disclosure. As shown in FIG. 5 and FIG. 6, the method is applied to a display device according to any one of the preceding embodiments.

The method for determining a pixel opening includes steps described below.

In step S101, a first variation curve corresponding to different sizes of pixel openings, different refractive indices of microlens units and different refractive indices of light-transmitting layers is acquired.

It may be defined that a pixel opening region covering a certain photon energy proportion is the smallest pixel opening. Exemplarily, a pixel opening region covering 95% of the range of the photon energy is of the minimum size of the pixel opening corresponding to the light-emitting element; that is, the total photon energy in the smallest pixel opening can be approached to be more than 95% of the total photon energy in a pixel opening occupying a region larger than the smallest pixel opening. Therefore, the display device has the lowest power consumption with this size of the pixel opening. The first variation curve corresponding to multiple groups of sizes of the pixel opening and differences between refractive indices of the microlens unit and refractive indices of the light-transmitting layer may be obtained.

In step S102, a second variation curve corresponding to the different refractive indices of the microlens units, the different refractive indices of the light-transmitting layer and gain factors of the display device is acquired.

Compared with a display device without a microlens array, the display device with a microlens array has significant energy gain. For different refractive indices of the microlens units and different refractive indices of the light-transmitting layer, gain factors of the display device are different; therefore, the corresponding relationship between the gain factors of the display device and the differences between the refractive indices of the microlens units and the refractive indices of the light-transmitting layer is obtained as the second variation curve.

In step S103, a parallel region range between the first variation curve and the second variation curve is selected according to the first variation curve and the second variation curve.

The size of the pixel opening reflects the luminance and the power consumption of the display device, so that the gain factors vary in parallel with the power consumption. Therefore, to determine the optimal size range of the pixel opening, it is necessary to intercept the parallel region between the first variation curve and the second change curve.

In step S104, a size range of the pixel opening is acquired according to the parallel region range.

Since the difference between the refractive index of the microlens unit and the refractive index of the light-transmitting layer is the abscissa, and the gain factor and the size of the pixel opening of the display device are the ordinates, respectively, the value range of the size of the pixel opening can be obtained according to the intercepted corresponding parallel region range. Exemplarily, the difference between the refractive index of the microlens unit and the refractive index of the light-transmitting layer is generally controlled from 0.2 to 0.35, and at this time, the corresponding size range of the pixel opening is from 0.8 μm to 1.35 μm. Then, the structure of the display device is determined to ensure the display effect of the display device.

In the embodiment of the present disclosure, the corresponding relationships of the sizes of the pixel openings, the gain factors of the display device and the differences between the refractive indices of the microlens unit and the refractive indices of the light-transmitting layer in the display device are acquired so that the size range of the pixel opening is determined within the selected parallel region range. In this manner, the optimized design of the pixel opening of the display device is ensured, so that the power consumption of the display device is reduced while the display effect of the display device is ensured.

Figure 7:
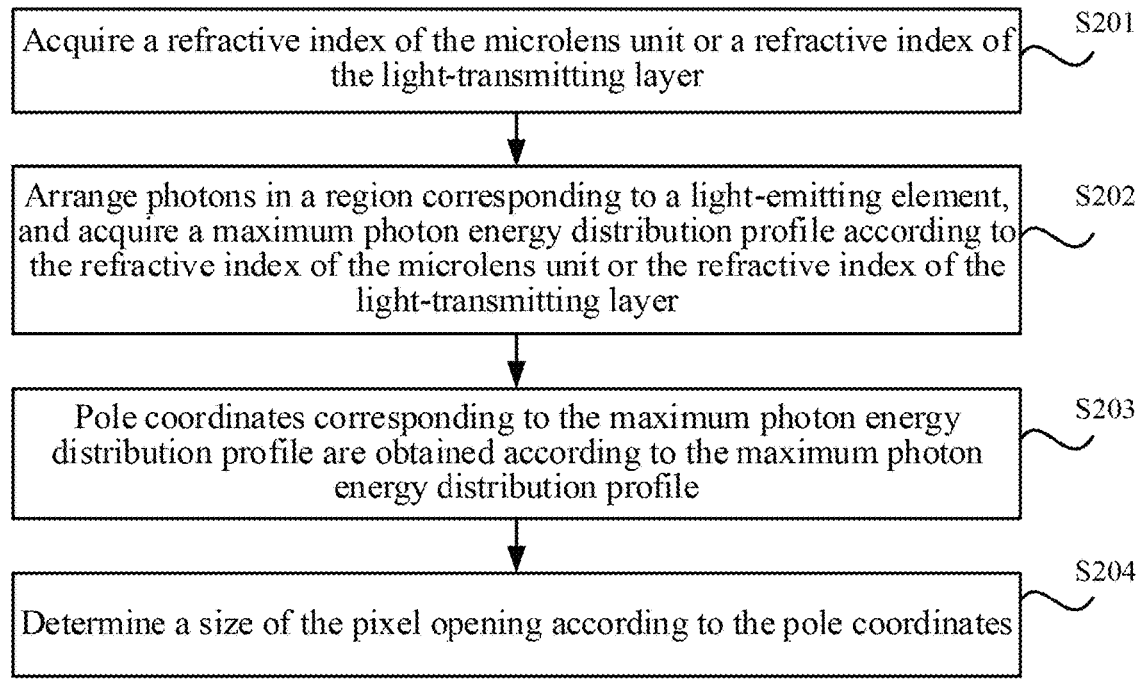
FIG. 7 is a flowchart of another method for determining a pixel opening of a display device according to an embodiment of the present disclosure.

Optionally, FIG. 7 is a flowchart of another method for determining a pixel opening of a display device according to an embodiment of the present disclosure. As shown in FIG. 7, the method is applied to the display device according to any one of the preceding embodiments.

The method for determining a pixel opening includes steps described below.

In S201, a refractive index of the microlens unit or a refractive index of the light-transmitting layer is acquired.

A difference exists between the refractive index of the microlens unit and the refractive index of the light-transmitting layer and is generally controlled within the range from 0.2 to 0.35 The refractive index of the microlens unit is acquired, and multiple groups of refractive index data of the light-transmitting layer can be acquired according to the simulation on the refractive index of the microlens unit; or the refractive index of the light-transmitting layer is acquired, and multiple groups of refractive index data of the microlens unit is acquired according to the refractive index of the light-transmitting layer.

In step S202, photons are arranged in a region corresponding to a light-emitting element, and a maximum photon energy distribution profile is acquired according to the refractive index of the microlens unit or the refractive index of the light-transmitting layer.

Figure 8:
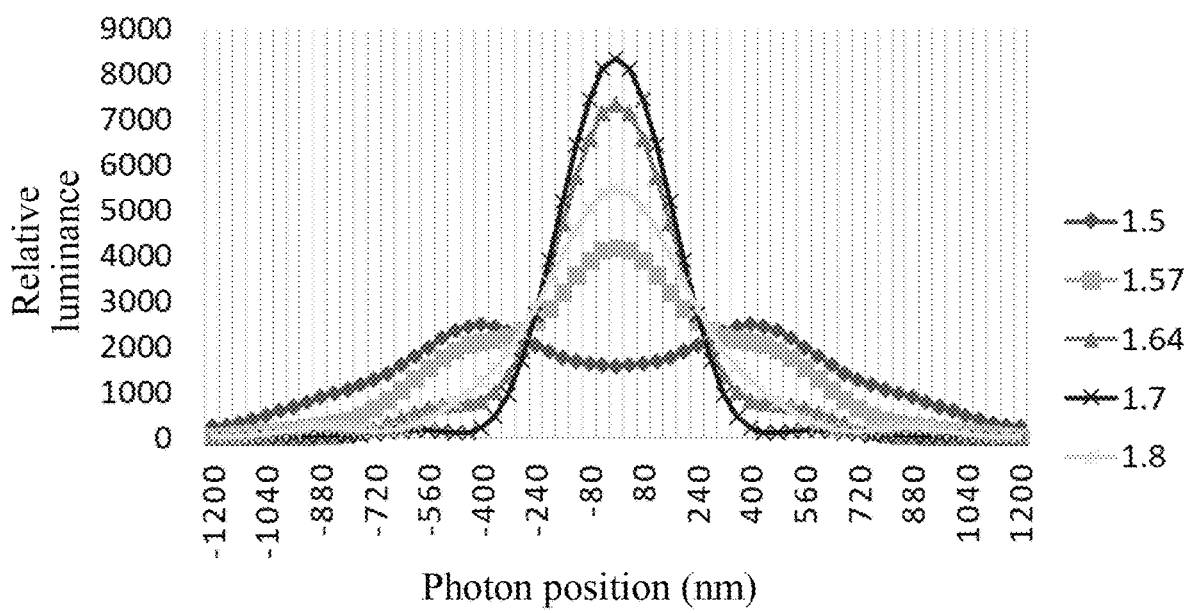
FIG. 8 is a graph showing photon energy distribution profiles according to an embodiment of the present disclosure.
Figure 9:
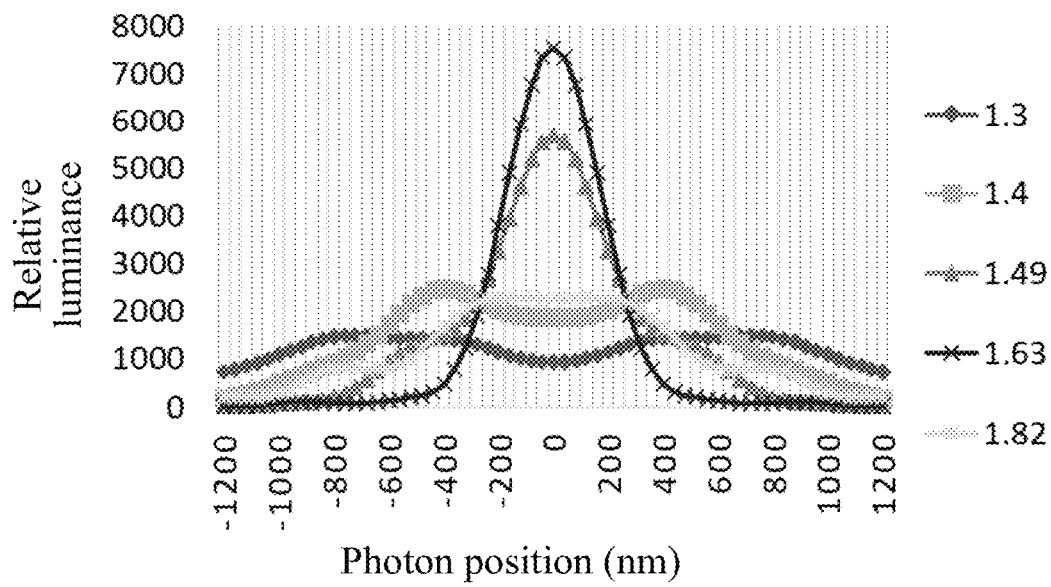
FIG. 9 is another graph showing photon energy distribution profiles according to an embodiment of the present disclosure.
Figure 10:
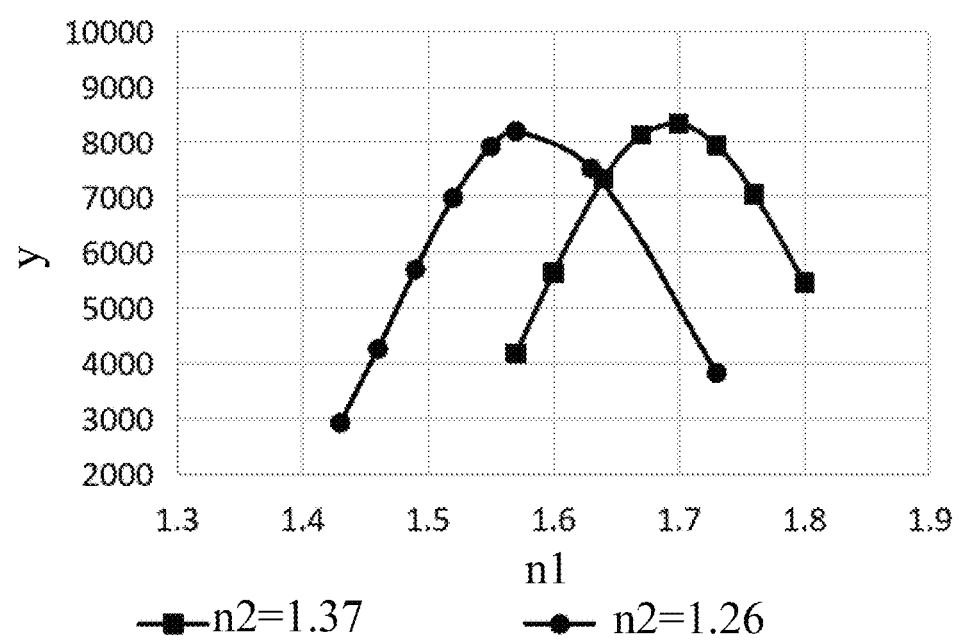
FIG. 10 is a graph showing relationships between refractive indices of a microlens unit and central photon energy according to an embodiment of the present disclosure.
Figure 11:
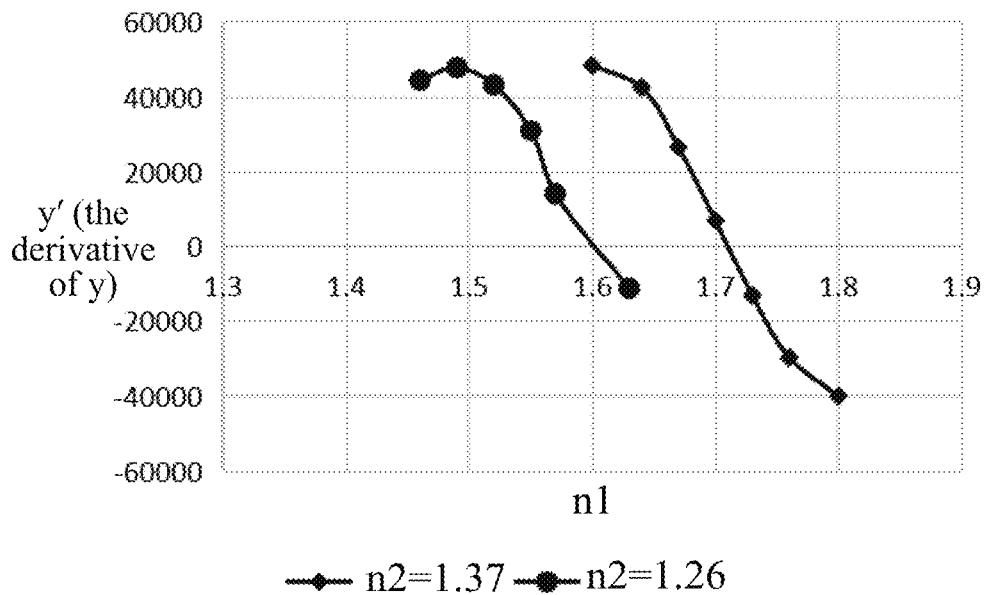
FIG. 11 is a graph showing relationships between refractive indices of a microlens unit and central photon energy derivatives according to an embodiment of the present disclosure.

FIG. 8 is a graph showing photon energy distribution profiles according to an embodiment of the present disclosure, FIG. 9 is another graph showing photon energy distribution profiles according to an embodiment of the present disclosure, FIG. 10 is a graph showing relationships between refractive indices of a microlens unit and central photon energy according to an embodiment of the present disclosure, and FIG. 11 is a graph showing relationships between refractive indices of a microlens unit and central photon energy derivatives according to an embodiment of the present disclosure. As shown in FIG. 8, FIG. 9, FIG. 10 and FIG. 11, photons are arranged in the region corresponding to the light-emitting element, and then multiple photon energy distribution profiles are acquired according to the refractive index of the microlens unit and multiple groups of refractive index data of the light-transmitting layer; or multiple photon energy distribution profiles are acquired according to the refractive index of the light-transmitting layer and multiple groups of refractive index data of the microlens unit. According to another method for determining a pixel opening of a display device shown in FIG. 7, when the refractive index of the light-transmitting layer is determined to be 1.37, multiple corresponding refractive indices, that is, 1.5, 1.57, 1.64, 1.7, and 1.8, of the microlens unit can be obtained, and multiple photon energy curves shown in FIG. 8 can be obtained. Alternatively, when the refractive index of the light-transmitting layer is determined to be 1.26, multiple corresponding refractive indices, that is, 1.3, 1.4, 1.49, 1.63, and 1.82, of the microlens unit can be obtained, and multiple photon energy curves shown in FIG. 9 can be obtained. Then the maximum photon energy distribution curve with the maximum photon energy is selected from the multiple photon energy curves.

In step S203, pole coordinates corresponding to the maximum photon energy distribution profile are obtained according to the maximum photon energy distribution profile.

Maximum photon energy in the maximum photon energy distribution profile is determined, and then pole coordinates of a relevant pixel opening are determined.

In step S204, a size of the pixel opening is determined according to the pole coordinates.

According to the pole coordinates, an effective light-emitting region of the light-emitting element is limited, the size of the pixel opening under the effective light-emitting region is determined, and thus the display effect of the display device is ensured.

In the embodiment of the present disclosure, the photon energy distribution profiles are drawn according to the corresponding relationship between different refractive indices of the microlens unit and different refractive indices of the light-transmitting layer, and the pixel opening of the display device is determined by selecting the maximum photon energy distribution profile. In this manner, the display effect of the display device is ensured, and the power consumption of the display device is effectively reduced.

Figure 12:
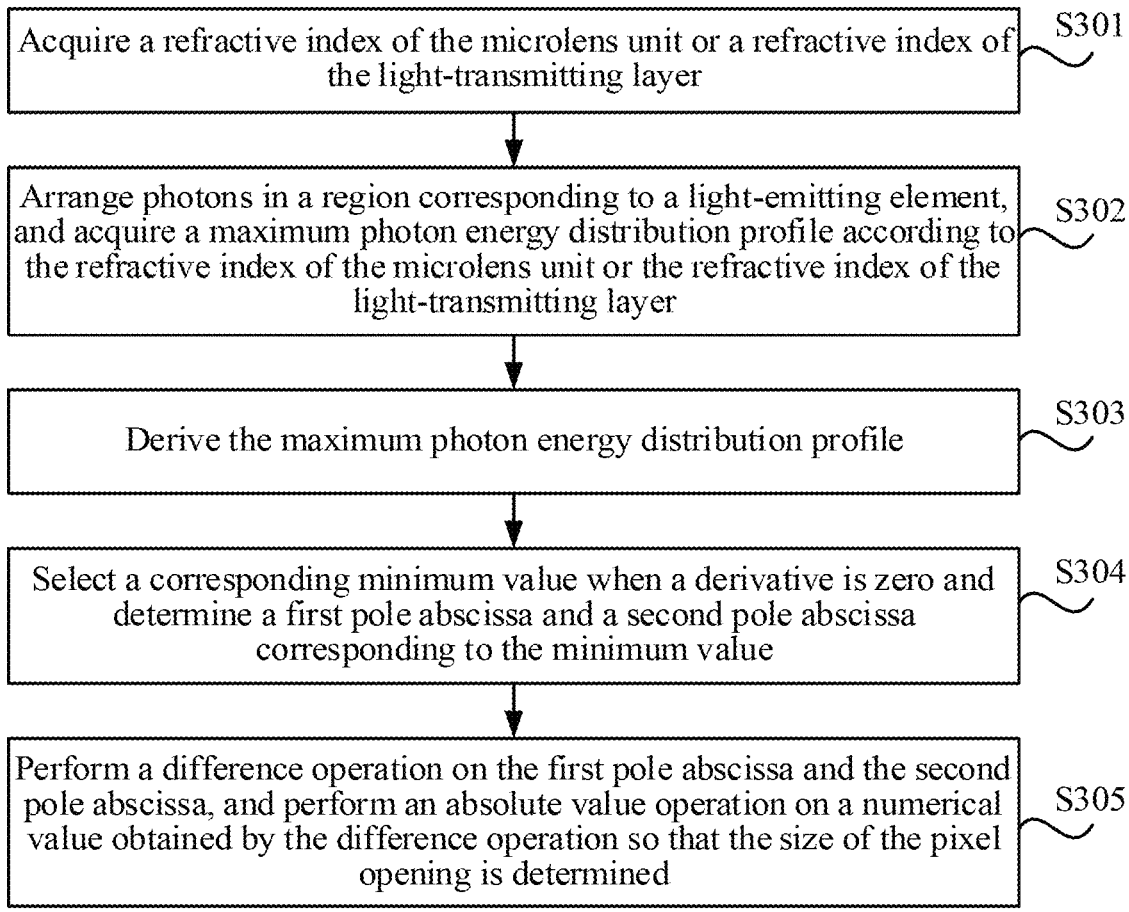
FIG. 12 is a flowchart of another method for determining a pixel opening of a display device according to an embodiment of the present disclosure.

Optionally, FIG. 12 is a flowchart of another method for determining a pixel opening of a display device according to an embodiment of the present disclosure. As shown in FIG. 12, the method is applied to the display device according to any one of the preceding embodiments.

The method for determining a pixel opening includes steps described below.

In S301, a refractive index of the microlens unit or a refractive index of the light-transmitting layer is acquired.

In step S302, photons are arranged in a region corresponding to a light-emitting element, and a maximum photon energy distribution profile is acquired according to the refractive index of the microlens unit or the refractive index of the light-transmitting layer.

In S303, the maximum photon energy distribution profile is derived.

The maximum photon energy distribution profile is derived so that it is convenient to select a photon position of which the derivative approaches zero, and thus it is convenient to determine the pixel opening of the display device.

In step S304, a corresponding minimum value when a derivative is zero is selected and a first pole abscissa and a second pole abscissa corresponding to the minimum value are determined.

The minimum value of the maximum photon energy distribution profile when the derivative is zero or approaches zero is selected, and then the first pole abscissa and the second pole abscissa corresponding to the minimum value are determined. Generally, the first pole abscissa and the second pole abscissa are symmetrically set. That is, the photon position is determined, and then the setting of the pixel opening is determined.

In S305, a difference operation is performed on the first pole abscissa and the second pole abscissa, and an absolute value operation is performed on a numerical value obtained by the difference operation so that the size of the pixel opening is determined.

After the first pole abscissa and the second pole abscissa are separately determined at the position where the derivative of the maximum photon energy distribution profile is zero, the difference operation is performed on the first pole abscissa and the second pole abscissa, and the absolute value operation is performed on the numerical value so that the size of the pixel opening obtained. That is, the opening at this time is of the optimal size of the pixel opening of the display device. With this pixel opening, the power consumption of the display device can be effectively saved.

In the embodiment of the present disclosure, the maximum photon energy distribution profile is selected, the maximum photon energy distribution profile is derived, the corresponding pole abscissas when the derivative is zero are determined, and then the pixel opening of the display device is determined according to the pole abscissas. In this manner, the display effect of the display device is ensured, and the power consumption of the display device is effectively reduced.

Figure 13:
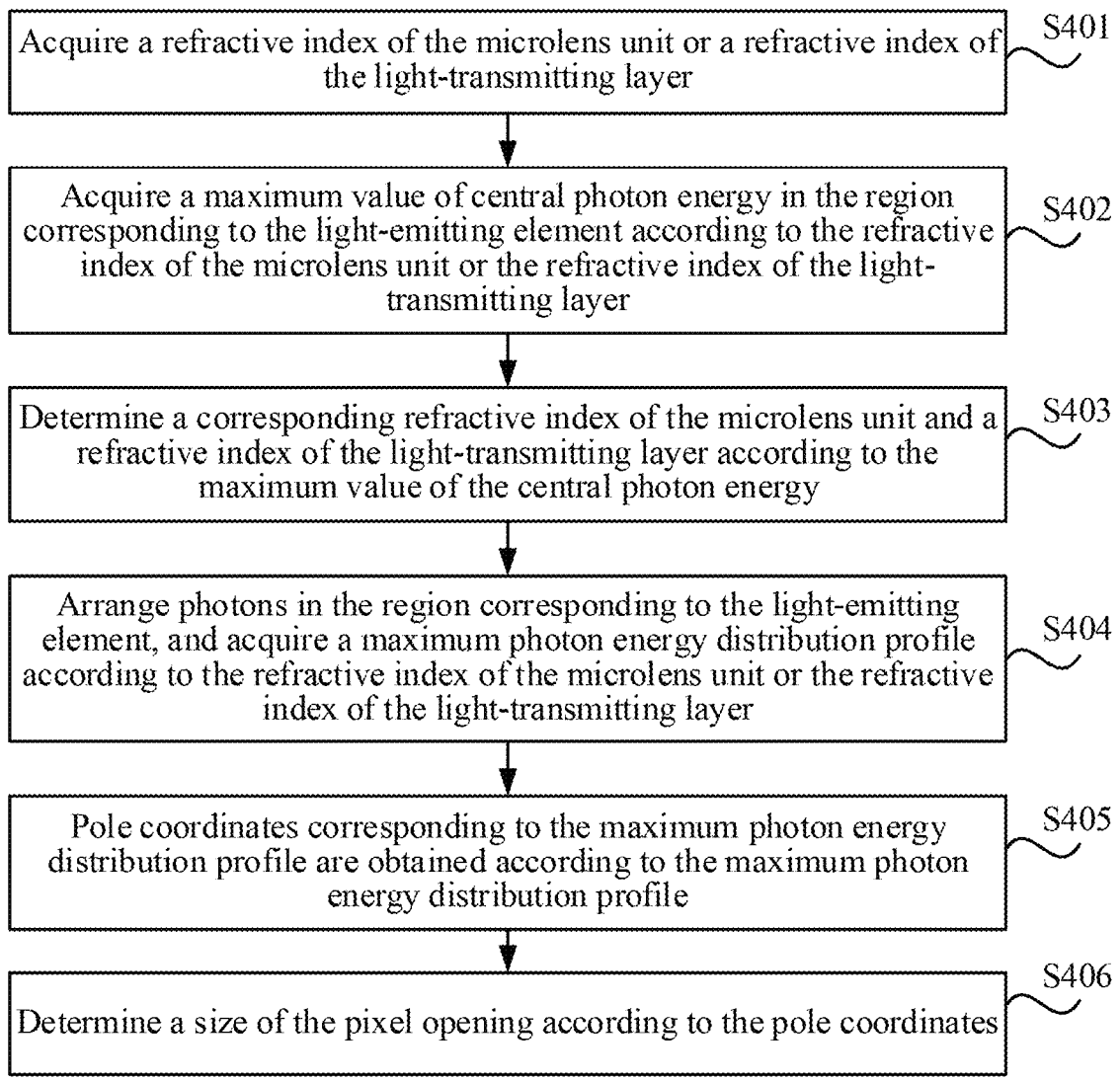
FIG. 13 is a flowchart of another method for determining a pixel opening of a display device according to an embodiment of the present disclosure.

Optionally, FIG. 13 is a flowchart of another method for determining a pixel opening of a display device according to an embodiment of the present disclosure. As shown in FIG. 13, the method is applied to the display device according to any one of the preceding embodiments.

The method for determining a pixel opening includes steps described below.

In S401, a refractive index of the microlens unit or a refractive index of the light-transmitting layer is acquired.

In step S402, a maximum value of central photon energy in the region corresponding to the light-emitting element is acquired according to the refractive index of the microlens unit or the refractive index of the light-transmitting layer.

The maximum value of the central photon energy in the region corresponding to the light-emitting element may be determined through the simulation operation according to numerical values of different refractive indices of the microlens unit and different refractive indices of the light-transmitting layer. Alternatively, the maximum value of the central photon energy in the region corresponding to the light-emitting element may be obtained according the following formula:

$$y = 261057*(n_1 + (1.37 - n_2))^2 + 885676*(n_1 + (1.37 - n_2)) - 742972.$$

Where y donates the central photon energy in the pixel opening, $n_1$ donates the refractive index of the microlens unit, and $n_2$ donates the refractive index of the light-emitting layer.

In step S403, a refractive index of the microlens unit corresponding to the maximum value of the central photon energy and a refractive index of the light-transmitting layer corresponding to the maximum value of the central photon energy are determined according to the maximum value of the central photon energy.

The maximum value of the central photon energy is acquired, so that the refractive index of the light-transmitting layer is determined on the premise that the refractive index of the microlens unit is determined; or the refractive index of the microlens unit can be determined on the premise that the refractive index of the light-transmitting layer is determined. In this manner, the specific numerical values of the refractive index of the microlens unit and the refractive index of the light-transmitting layer are determined, and thus the setting of the structure of the display device is ensured. Further, the pixel opening of the light-emitting element matching with the refractive index of the microlens unit and the refractive index of the light-transmitting layer is determined, so that the display effect of the display device is ensured.

In step S404, photons are arranged in the region corresponding to the light-emitting element, and a maximum photon energy distribution profile is acquired according to the refractive index of the microlens unit or the refractive index of the light-transmitting layer.

In step S405, pole coordinates corresponding to the maximum photon energy distribution profile are obtained according to the maximum photon energy distribution profile.

In step S406, a size of the pixel opening is determined according to the pole coordinates.

In the embodiment of the present disclosure, the maximum value of the central photon energy in the region corresponding to the light-emitting element is acquired, and then the corresponding refractive index of the microlens unit and the corresponding refractive index of the light-transmitting layer are determined, so that the pixel opening of the light-emitting element is matched, and the display effect of the display device is ensured. In addition, the consumption of the display device is effectively reduced, and the energy is saved.

Figure 14:
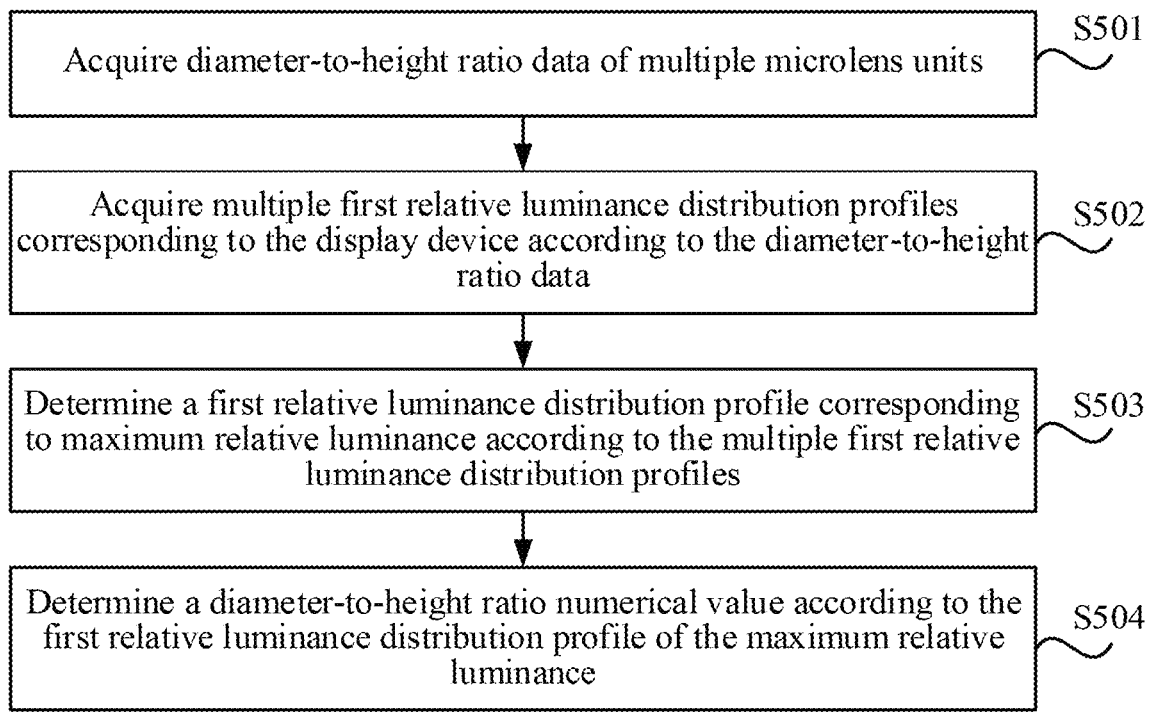
FIG. 14 is a flowchart of another method for determining a pixel opening of a display device according to an embodiment of the present disclosure.
Figure 15:
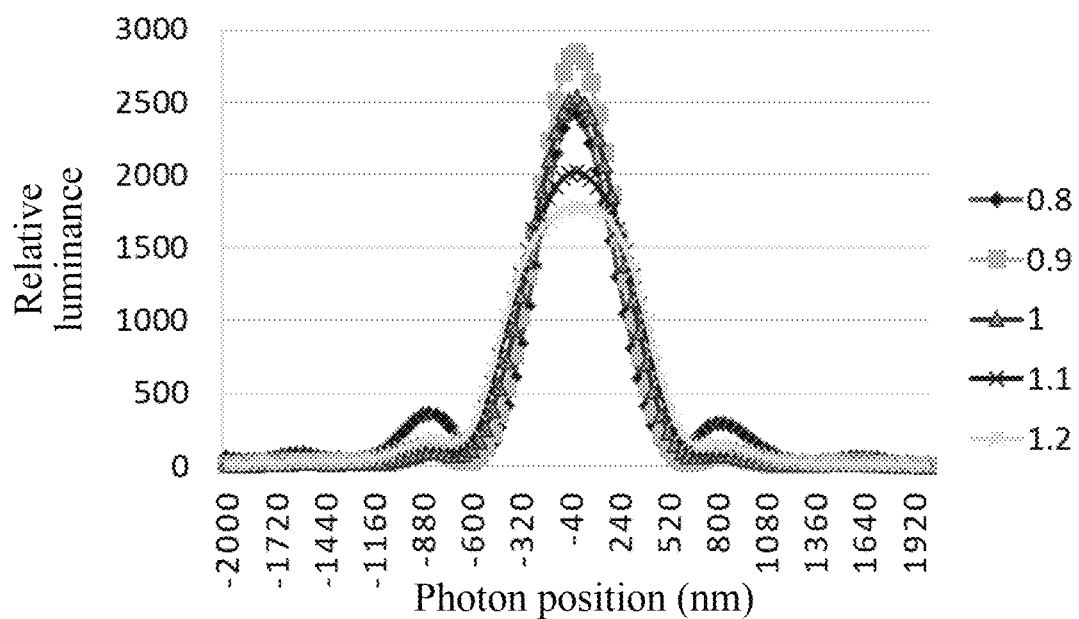
FIG. 15 is a graph showing distribution profiles of photon energy in a pixel opening under different pieces of diameter-to-height ratio data of a microlens unit according to an embodiment of the present disclosure.
Figure 16:
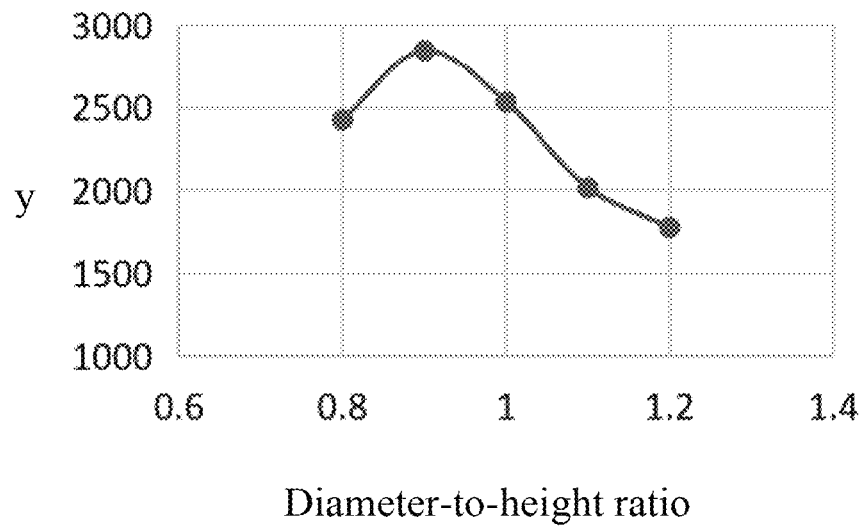
FIG. 16 is a graph showing a variation curve of diameter-to-height data of a microlens unit and photon energy according to an embodiment of the present disclosure.

Optionally, FIG. 14 is a flowchart of another method for determining a pixel opening of a display device according to an embodiment of the present disclosure, FIG. 15 is a graph showing distribution profiles of photon energy in a pixel opening under different pieces of diameter-to-height ratio data of microlens units according to an embodiment of the present disclosure, and FIG. 16 is a graph showing a variation curve of diameter-to-height data of microlens units and photon energy according to an embodiment of the present disclosure. As shown in FIG. 14, FIG. 15 and FIG. 16, the method is applied to the display device according to any one of the preceding embodiments. The pixel opening of the display device is also related to the diameter-to-height ratio of the microlens unit; therefore, the diameter-to-height ratio of the microlens array may be further rationally set to ensure the effective size of the pixel opening of the light-emitting element.

The method for determining a pixel opening includes steps described below.

In step S501, diameter-to-height ratio data of the multiple microlens units is acquired.

Multiple pieces of diameter-to-height ratio data of different microlens units are acquired. Exemplarily, as shown in the FIG. 15, numerical values of the diameter-to-height data may be 0.8, 0.9, 1, 1.1 and 1.2, respectively.

In step S502, multiple first relative luminance distribution profiles corresponding to the display device are acquired according to the diameter-to-height ratio data.

Photons are arranged in the region of the pixel opening, and then the first relative luminance distribution profiles of the display device are correspondingly acquired according to different pieces of diameter-to-height data so that the distribution state of photon energy is reflected.

In step S503, a first relative luminance distribution profile corresponding to maximum relative luminance is determined according to the multiple first relative luminance distribution profiles.

Multiple first relative luminance distribution profiles acquired corresponding to different diameter-to-height ratio data curves are drawn in the same coordinate system, and then the first relative luminance distribution profile having the maximum relative luminance is acquired.

In step S504, a diameter-to-height ratio numerical value is determined according to the first relative luminance distribution profile of the maximum relative luminance.

Diameter-to-height data of the microlens unit is correspondingly acquired according to the diameter-to-height ratio numerical value corresponding to the first relative luminance distribution profile having the maximum relative luminance, and then the size of the microlens unit is determined. In this manner, the microlens unit matches the design of the pixel opening, the display effect of the display device is achieved, and the power consumption is greatly reduced. In addition, each first relative luminance distribution profile may be derived so that maximum relative luminance corresponding to the each first relative luminance distribution profile is obtained. As shown in FIG. 16, the diameter-to-height ratio data is taken as the abscissa, the maximum relative luminance is taken as the ordinate, and thus the corresponding relationship between the diameter-to-height ratio and the luminance can be visually reflected. Exemplarily, as shown in the figure, when the diameter-to-height ratio is 0.9, the maximum relative luminance exists.

In the embodiment of the present disclosure, the diameter-to-height ratio of the microlens unit corresponding to the maximum relative luminance is determined according to the corresponding relationship between different pieces of diameter-to-height ratio data and the luminance of the display device, so that the pixel opening of the light-emitting element is matched, the display effect of the display device is ensured, and the power consumption is effectively reduced.

Figure 17:
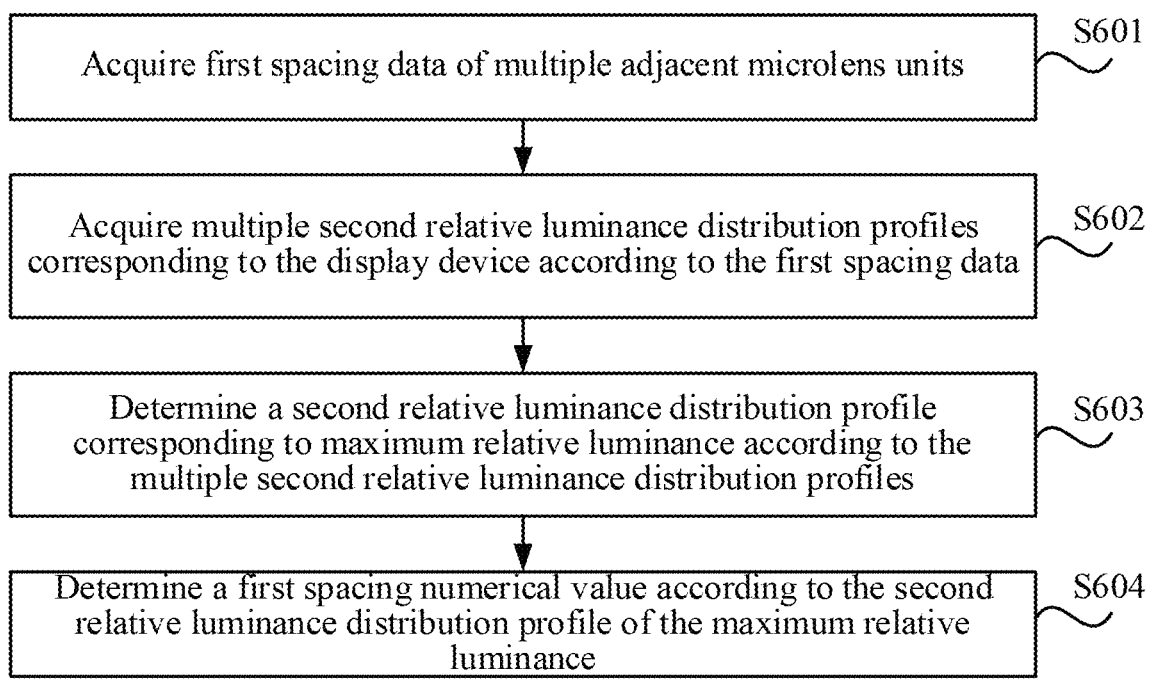
FIG. 17 is a flowchart of another method for determining a pixel opening of a display device according to an embodiment of the present disclosure.
Figure 18:
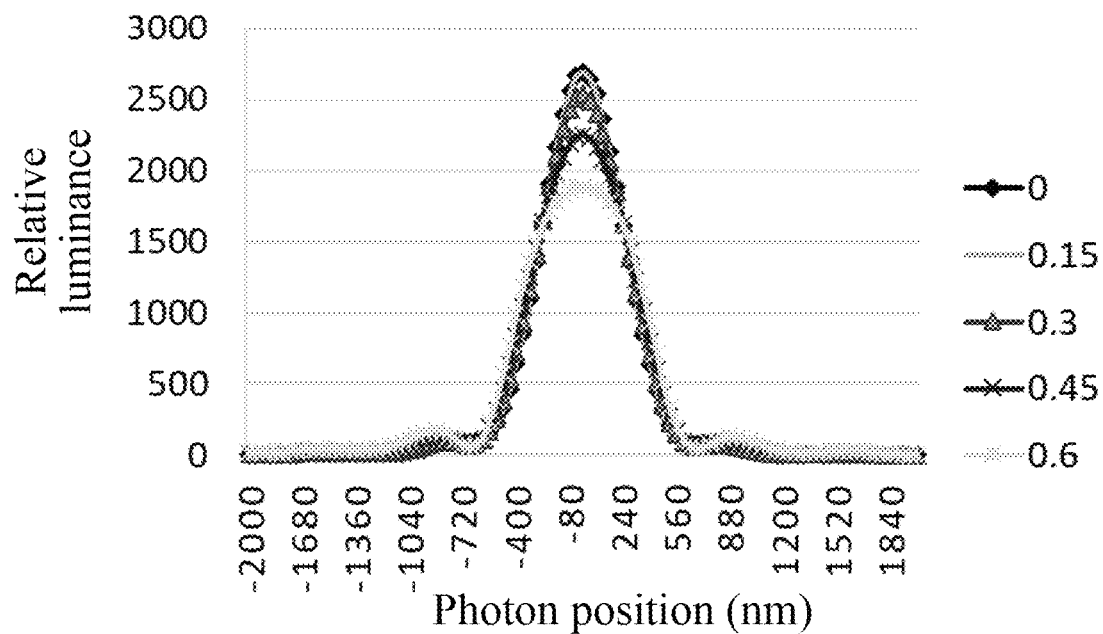
FIG. 18 is a graph showing distribution profiles of photon energy in a pixel opening under different pieces of first spacing data according to an embodiment of the present disclosure.
Figure 19:
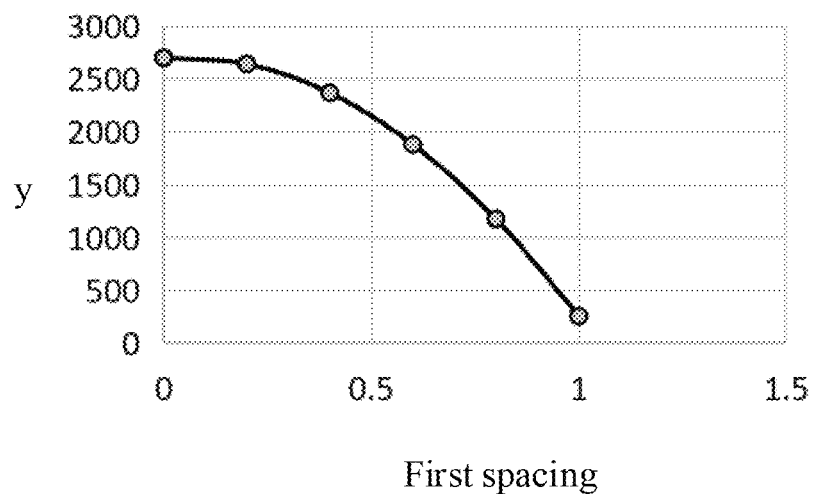
FIG. 19 is a graph showing a variation curve of first spacing data and photon energy according to an embodiment of the present disclosure.

Optionally, FIG. 17 is a flowchart of another method for determining a pixel opening of a display device according to an embodiment of the present disclosure, FIG. 18 is a graph showing distribution profiles of photon energy in a pixel opening under different pieces of first spacing data according to an embodiment of the present disclosure, and FIG. 19 is a graph showing a variation curve of first spacing data and photon energy according to an embodiment of the present disclosure. As shown in FIG. 17, FIG. 18 and FIG. 19, the method is applied to the display device according to any one of the preceding embodiments. The pixel opening of the display device is also related to the spacing between adjacent microlens units; therefore, the spacing between adjacent microlens units may be further rationally set to ensure the effective size of the pixel opening of the light-emitting element.

The method for determining a pixel opening includes steps described below.

In step S601, first spacing data of multiple adjacent microlens units are acquired.

The multiple pieces of first spacing data between adjacent microlens units are acquired. Exemplarily, as shown in the figure, the first spacing data may be 0, 0.15, 0.3, 0.45 and 0.6, respectively.

In step S602, multiple second relative luminance distribution profiles corresponding to the display device are acquired according to the first spacing data.

Photons are arranged in the region of the pixel opening, and then the second relative luminance distribution profiles of the display device are correspondingly acquired under different pieces of first spacing data so that the distribution state of photon energy is reflected.

In step S603, a second relative luminance distribution profile corresponding to maximum relative luminance is determined according to the multiple second relative luminance distribution profiles.

Multiple second relative luminance distribution profiles acquired corresponding to different first spacing data curves are drawn in the same coordinate system, and then the second relative luminance distribution profile having the maximum relative luminance is acquired.

In step S604, a first spacing numerical value is determined according to the second relative luminance distribution profile of the maximum relative luminance.

First spacing data between adjacent microlens units is correspondingly acquired according to the first spacing numerical value corresponding to the second relative luminance distribution profile having the maximum relative luminance, and then the spacing between adjacent microlens units is determined. In this manner, the distance between microlens units is adjusted to match the design of the pixel opening, the display effect of the display device is achieved, and the power consumption is greatly reduced. In addition, each second relative luminance distribution profile may be derived so that maximum relative luminance corresponding to the each second relative luminance distribution profile is obtained. As shown in FIG. 19, the first spacing is taken as the abscissa, the maximum relative luminance is taken as the ordinate, and thus the corresponding relationship between the first spacing and the luminance can be visually reflected. Exemplarily, as shown in the figure, when the first spacing is 0, the maximum relative luminance exists.

In the embodiment of the present disclosure, the first spacing between adjacent microlens units corresponding to the maximum relative luminance is determined according to the corresponding relationship between different pieces of first spacing data between adjacent microlens units and the luminance of the display device, so that the pixel opening of the light-emitting element is matched, the display effect of the display device is ensured, and the power consumption is effectively reduced.

Figure 20:
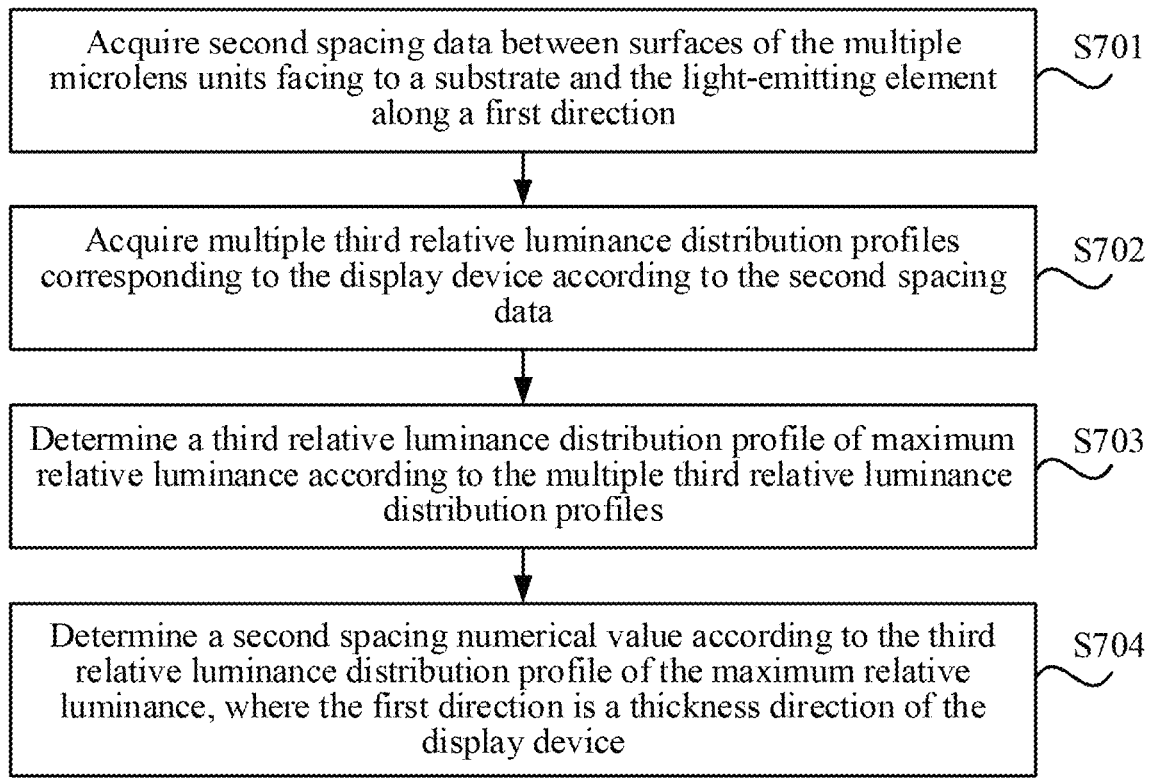
FIG. 20 is a flowchart of another method for determining a pixel opening of a display device according to an embodiment of the present disclosure.
Figure 21:
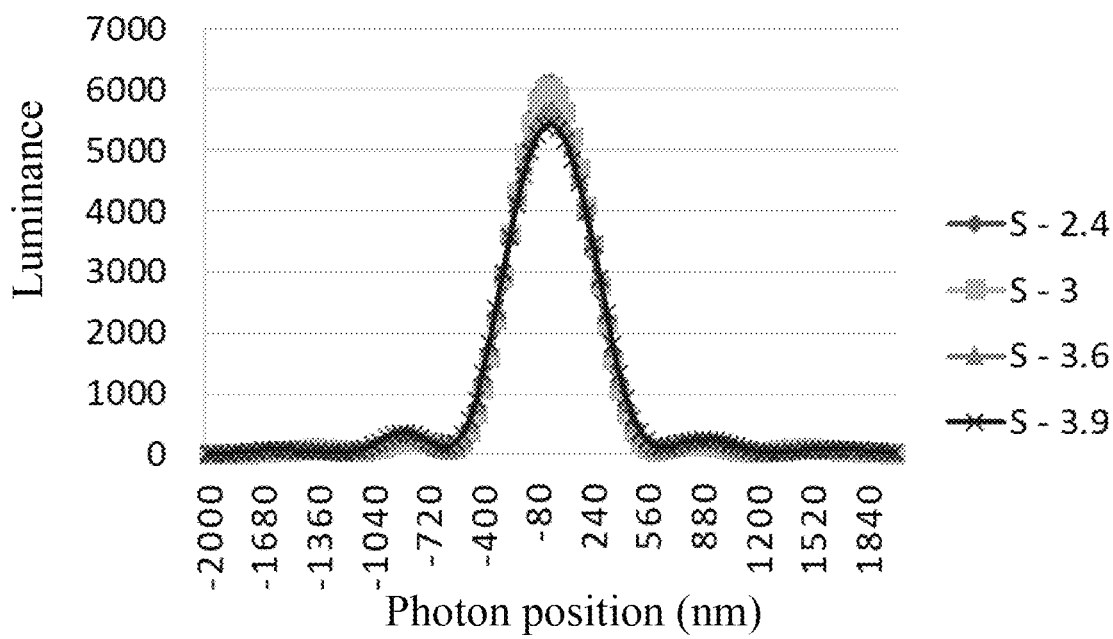
FIG. 21 is a graph showing distribution profiles of luminance under different pieces of second spacing data according to an embodiment of the present disclosure.
Figure 22:
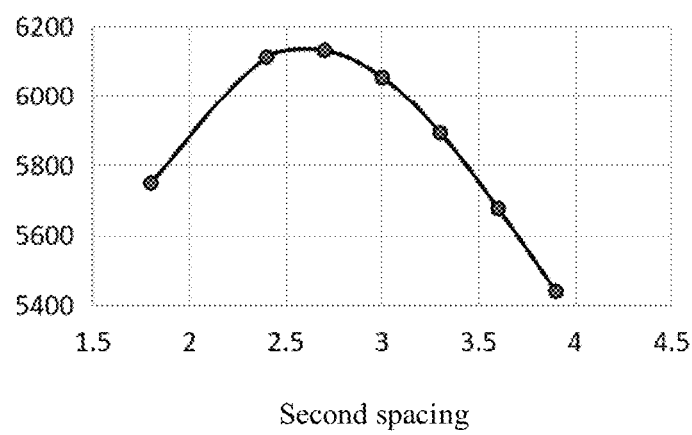
FIG. 22 is a graph showing a variation curve of second spacing data and photon energy according to an embodiment of the present disclosure.

Optionally, FIG. 20 is a flowchart of another method for determining a pixel opening of a display device according to an embodiment of the present disclosure, FIG. 21 is a graph showing distribution profiles of luminance under different pieces of second spacing data according to an embodiment of the present disclosure, and FIG. 22 is a graph showing a variation curve of second spacing data and photon energy according to an embodiment of the present disclosure. As shown in FIG. 20, FIG. 21 and FIG. 22, the method is applied to the display device according to any one of the preceding embodiments. The pixel opening of the display device is also related to the distance between the microlens unit and the light-emitting element; therefore, the distance between the microlens unit and the light-emitting element may be further rationally set to ensure the effective size of the pixel opening of the light-emitting element.

The method for determining a pixel opening includes steps described below.

In step S701, second spacing data between surfaces of multiple microlens units facing to a substrate and the light-emitting element along a first direction are acquired.

The multiple pieces of second spacing data between the surfaces of the microlens units facing to the substrate and the light-emitting element are acquired. Exemplarily, as shown in the figure, the multiple pieces of second spacing data may be 2.4, 3, 3.6 and 3.9, respectively.

In step S702, multiple third relative luminance distribution profiles corresponding to the display device are acquired according to the multiple pieces of second spacing data.

Photons are arranged in the region of the pixel opening, and then the third relative luminance distribution profiles of the display device are correspondingly acquired under different pieces of second spacing data so that the distribution state of photon energy is reflected.

In step S703, a third relative luminance distribution profile of maximum relative luminance is determined according to the multiple third relative luminance distribution profiles.

Multiple third relative luminance distribution profiles acquired corresponding to different second spacing data curves are drawn in the same coordinate system, and then the third relative luminance distribution profile having the maximum relative luminance is acquired.

In step S704, a second spacing numerical value is determined according to the third relative luminance distribution profile of the maximum relative luminance, where the first direction is a thickness direction of the display device.

Second spacing data between the microlens unit and the light-emitting element is correspondingly acquired according to the second spacing numerical value corresponding to the third relative luminance distribution profile having the maximum relative luminance, that is, the thickness of an isolation layer is determined. In this manner, the distance between the microlens unit and the light-emitting element is adjusted to match the design of the pixel opening, the display effect of the display device is achieved, and the power consumption is greatly reduced. In addition, each third relative luminance distribution profile may be derived so that maximum relative luminance corresponding to the each third relative luminance distribution profile is obtained. As shown in FIG. 22, the second spacing data is taken as the abscissa, the maximum relative luminance is taken as the ordinate, and thus the corresponding relationship between the second spacing and the luminance can be visually reflected. Exemplarily, as shown in the figure, when the first spacing is 2.5 μm, the maximum relative luminance exists.

In the embodiment of the present disclosure, the second spacing between the microlens unit and the light-emitting element corresponding to the maximum relative luminance is determined according to the corresponding relationship between second spacing data between different microlens unit and the light-emitting element and the luminance of the display device, so that the pixel opening of the light-emitting element is matched, the display effect of the display device is ensured, and the power consumption is effectively reduced.

Figure 23:
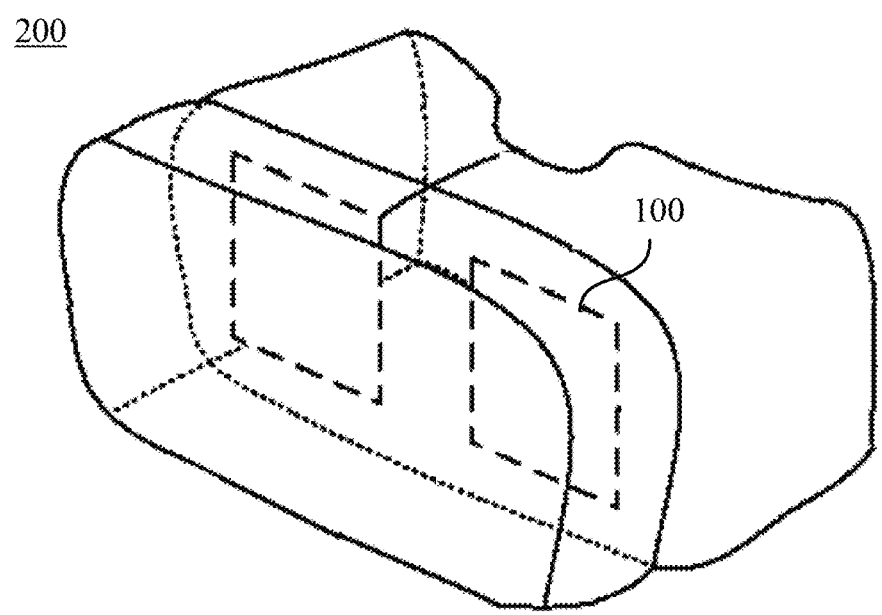
FIG. 23 is a structural diagram of a near-eye display apparatus according to an embodiment of the present disclosure.

FIG. 23 is a structural diagram of a near-eye display apparatus according to an embodiment of the present disclosure. As shown in FIG. 23, the near-eye display apparatus may be a virtual reality (VR) display device, which includes the display device according to any one of the preceding embodiments.

It is to be noted that the near-eye display apparatus provided in the embodiment includes any display device provided in the embodiments of the present disclosure and thus has beneficial effects the same as or corresponding to the display device, which is not repeated here.

The preceding specific embodiments do not limit the scope of the present disclosure. It is to be understood by those skilled in the art that various modifications, combinations, sub-combinations and substitutions may be performed according to design requirements and other factors. Any modification, equivalent substitution, improvement and the like made within the spirit and principle of the present disclosure is within the scope of the present disclosure.

What is claimed is:

1. A display device, comprising:
a substrate;
light-emitting elements, wherein the light-emitting elements are located on one side of the substrate and facing a light-emitting surface of the display device, and a pixel opening is configured in each light-emitting element of the light-emitting elements; and
a light adjustment layer, wherein the light adjustment layer is located on one side of the light-emitting elements away from the substrate;
wherein the light adjustment layer comprises at least one microlens array and a light-transmitting layer located on one side of the at least one microlens array away from the substrate and covering the at least one microlens array, the at least one microlens array comprises at least one microlens unit, and a refractive index of the at least one microlens unit is greater than a refractive index of the light-transmitting layer; and
along a thickness direction of the display device, the pixel opening at least partially overlaps the at least one microlens unit; and R denotes a size of the pixel opening and satisfies 0.8 μm≤R≤1.35 μm.

2. The display device according to claim 1, wherein n denotes a difference between the refractive index of the at least one microlens unit and the refractive index of the light-transmitting layer and n satisfies 0.2≤n≤0.35.

3. The display device according to claim 1, wherein a relationship between the size of the pixel opening and a difference between the refractive index of the at least one microlens unit and the refractive index of the light-transmitting layer satisfies:

$$R = 126.38n^3 - 78.819n^2 + 9.1209n + 1.8654;$$

wherein R denotes the size of the pixel opening, and n denotes the difference between the refractive index of the at least one microlens unit and the refractive index of the light-transmitting layer.

4. The display device according to claim 1, wherein a relationship between central photon energy in the pixel opening, the refractive index of the at least one microlens unit and the refractive index of the light-transmitting layer satisfies:

$$y = 261057 * (n_1 + (1.37 - n_2))^2 + 885676 * (n_1 + (1.37 - n_2)) - 742972;$$

wherein y denotes the central photon energy in the pixel opening, $n_1$ denotes the refractive index of the at least one microlens unit, and $n_2$ denotes the refractive index of the light-transmitting layer.

5. A method for determining a pixel opening of a display device, applied to the display device according to claim 1, comprising:
acquiring a first variation curve corresponding to different sizes of pixel openings, different refractive indices of microlens units and different refractive indices of light-transmitting layers;
acquiring a second variation curve corresponding to the different refractive indices of the microlens units, the different refractive indices of the light-transmitting layers and gain factors of the display device;
selecting a parallel region range between the first variation curve and the second variation curve according to the first variation curve and the second variation curve; and
acquiring a size range of the pixel opening according to the parallel region range.

6. The method for determining a pixel opening of a display device according to claim 5, after acquiring the size range of the pixel opening according to the parallel region range, further comprising:
acquiring a refractive index of a microlens unit or a refractive index of a light-transmitting layer;
arranging photons in a region corresponding to a light-emitting element, and acquiring a maximum photon energy distribution profile according to the refractive index of the microlens unit or the refractive index of the light-transmitting layer;
obtaining pole coordinates corresponding to the maximum photon energy distribution profile according to the maximum photon energy distribution profile; and
determining a size of a pixel opening according to the pole coordinates.

7. The method for determining a pixel opening of a display device according to claim 6, wherein the obtaining the pole coordinates corresponding to the maximum photon energy distribution profile according to the maximum photon energy distribution profile comprises:
deriving the maximum photon energy distribution profile; and
selecting a corresponding minimum value when a derivative is zero and determining a first pole abscissa and a second pole abscissa corresponding to the minimum value; and
wherein determining the size of the pixel opening according to the pole coordinates comprises:
performing a difference operation on the first pole abscissa and the second pole abscissa, and performing an absolute value operation on a numerical value obtained by the difference operation to determine the size of the pixel opening.

8. The method for determining a pixel opening of a display device according to claim 6, wherein before acquiring the maximum photon energy distribution profile according to the refractive index of the microlens unit or the refractive index of the light-transmitting layer, further comprising:
acquiring a maximum value of central photon energy in the region corresponding to the light-emitting element according to the refractive index of the microlens unit or the refractive index of the light-transmitting layer; and
determining a refractive index of the microlens unit corresponding to the maximum value of the central photon energy and a refractive index of the light-transmitting layer corresponding to the maximum value of the central photon energy according to the maximum value of the central photon energy.

9. The method for determining a pixel opening of a display device according to claim 6, after determining the size of the pixel opening according to the pole coordinates, further comprising:
acquiring diameter-to-height ratio data of a plurality of microlens units;

acquiring a plurality of first relative luminance distribution profiles corresponding to the display device according to the diameter-to-height ratio data;

determining a first relative luminance distribution profile corresponding to maximum relative luminance according to the plurality of first relative luminance distribution profiles;

determining a diameter-to-height ratio numerical value according to the first relative luminance distribution profile of the maximum relative luminance;

acquiring first spacing data of a plurality of adjacent microlens units;

acquiring a plurality of second relative luminance distribution profiles corresponding to the display device according to the first spacing data;

determining a second relative luminance distribution profile corresponding to maximum relative luminance according to the plurality of second relative luminance distribution profiles;

determining a first spacing numerical value according to the second relative luminance distribution profile of the maximum relative luminance;

acquiring second spacing data between surfaces of the microlens units facing to a substrate and the light-emitting element along a first direction;

acquiring a plurality of third relative luminance distribution profiles corresponding to the display device according to the second spacing data;

determining a third relative luminance distribution profile of maximum relative luminance according to the plurality of third relative luminance distribution profiles; and determining a second spacing numerical value according to the third relative luminance distribution profile of the maximum relative luminance;

wherein the first direction is a thickness direction of the display device.

10. A near-eye display apparatus, comprising a display device, wherein the display device comprises:

a substrate;

light-emitting elements, wherein the light-emitting elements are located on one side of the substrate and facing a light-emitting surface of the display device, and a pixel opening is configured in each light-emitting element of the light-emitting elements; and a light adjustment layer, wherein the light adjustment layer is located on one side of the light-emitting elements away from the substrate;

wherein the light adjustment layer comprises at least one microlens array and a light-transmitting layer located on one side of the at least one microlens array away from the substrate and covering the at least one microlens array, the at least one microlens array comprises at least one microlens unit, and a refractive index of the at least one microlens unit is greater than a refractive index of the light-transmitting layer; and along a thickness direction of the display device, the pixel opening at least partially overlaps the at least one microlens unit; and R denotes a size of the pixel opening and satisfies $0.8\ \mu m \le R \le 1.35\ \mu m$.

* * * * *